US006607857B2

(12) United States Patent
Blunk et al.

(10) Patent No.: US 6,607,857 B2
(45) Date of Patent: Aug. 19, 2003

(54) FUEL CELL SEPARATOR PLATE HAVING CONTROLLED FIBER ORIENTATION AND METHOD OF MANUFACTURE (75) Inventors: Richard H. Blunk, Macomb, MI (US); Charles L. Tucker, Savoy, IL (US); Yeong-Eun Yoo, Taejon (KR); Daniel J. Lisi, Eastpointe, MI (US)

(73) Assignee: General Motors Corporation, Detroit, MI (US)

( * ) Notice: Subject to any disclaimer, the term of this patent is extended or adjusted under 35 U.S.C. 154(b) by 91 days.

(21) Appl. No.: 09/871,189

(22) Filed: May 31, 2001

(65) Prior Publication Data
US 2002/0182473 A1 Dec. 5, 2002

(51) Int. Cl.[7] .......................... H01M 2/00; H01M 2/02; H01M 2/08; B32B 5/16; D02G 3/00
(52) U.S. Cl. .............................. 429/34; 429/36; 429/38; 428/357; 428/359; 428/361
(58) Field of Search ................. 429/34, 35, 36, 429/38, 39; 428/357, 359, 361, 367

(56) References Cited

U.S. PATENT DOCUMENTS

| 4,197,178 | A |   | 4/1980  | Pellegri et al. |         |
|-----------|---|---|---------|-----------------|---------|
| 4,510,219 | A |   | 4/1985  | Rowlette        |         |
| 4,542,082 | A |   | 9/1985  | Rowlette        |         |
| 4,547,443 | A |   | 10/1985 | Rowlette et al. |         |
| 4,625,395 | A |   | 12/1986 | Rowlette        |         |
| 4,658,499 | A |   | 4/1987  | Rowlette        |         |
| 5,017,446 | A |   | 5/1991  | Reichman et al. |         |
| 5,482,680 | A | * | 1/1996  | Wilkinson et al. | 422/177 |
| 5,503,945 | A | * | 4/1996  | Petri et al.    | 429/35  |
| 5,562,741 | A | * | 10/1996 | Meadows et al.  | 29/623.2 |
| 6,001,139 | A | * | 12/1999 | Asanuma et al.  | 29/623.3 |
| 6,059,847 | A | * | 5/2000  | Farahmandi et al. | 29/25.03 |
| 6,087,034 | A | * | 7/2000  | Mercuri         | 429/44  |
| 6,096,450 | A |   | 8/2000  | Walsh           |         |
| 6,099,984 | A |   | 8/2000  | Rock            |         |
| 6,103,413 | A |   | 8/2000  | Hinton et al.   |         |
| 6,182,804 | B1 | * | 2/2001  | Lam            | 188/251 A |
| 6,248,467 | B1 | * | 6/2001  | Wilson et al.   | 429/39  |
| 6,322,919 | B1 | * | 11/2001 | Yang et al.     | 429/34  |
| 6,338,913 | B1 | * | 1/2002  | Eshraghi        | 429/41  |
| 6,379,795 | B1 | * | 4/2002  | Bisaria et al.  | 428/378 |
| 6,451,485 | B1 | * | 9/2002  | James et al.    | 429/232 |

OTHER PUBLICATIONS

Electrical conductivity of polyethylene–carbon–fibre composites mixed with carbon black, F.J. Balta Calleja, R.K. Bayer, T.A. Ezquerra, Instituto de Estructura de la Materia, CSIC, Serrano 119, 28 006 Madrid, Spain; Jul. 27, 1987; pp. 1411–1415.

Fiber orientation in 3–D injection molded features: prediction and experiment; Brent E. VerWeyst, Charles L. Tucker III, Peter H. Foss, and John F. O'Gara; Jun. 18, 1999; pp. 1–26.

* cited by examiner

Primary Examiner—Randy Gulakowski
Assistant Examiner—Donald V. Scaltrito
(74) Attorney, Agent, or Firm—Karl F. Barr, Jr.; Cary W. Brooks; Linda M. Deschere (57) ABSTRACT A composite separator plate for a fuel cell having a low-carbon loading and a high-polymer loading is disclosed. The separator plate composition includes a percentage of conductive fibrous filler having a relatively high aspect-ratio oriented through the thickness of the plate to achieve desired electrical and thermal conductivity requirements. A method of manufacturing the fuel separator plate having such fibers disposed in a through-plane orientation is also disclosed. The method includes forming a separator plate having a land height for orienting the fibers in a desired through-plane direction, then removing a portion of the land height to obtained the desired geometric configuration for the separator plate.

42 Claims, 4 Drawing Sheets

FUEL CELL SEPARATOR PLATE HAVING CONTROLLED FIBER ORIENTATION AND METHOD OF MANUFACTURE

TECHNICAL FIELD

The present invention relates to PEM fuel cells, and more particularly to a composite separator plate having oriented fibers to enhance the electrical and thermal conductivity of the fuel cell separator plate, and a method of manufacturing same.

BACKGROUND OF THE INVENTION

Fuel cells have been proposed as a power source for many applications. One such fuel cell is the proton exchange membrane or PEM fuel cell. PEM fuel cells are well known in the art and include in each cell thereof a membrane electrode assembly or MEA. The MEA is a thin, proton-conductive, polymeric, membrane-electrolyte having an anode electrode film formed on one face thereof and a cathode electrode film formed on the opposite face thereof. Such MEAs are well known in the art and are described in such as U.S. Pat. Nos. 5,272,017 and 3,134,697, as well as in the Journal of Power Sources, Volume 29 (1990) pages 367–387, inter alia.

In general, MEAs are made from ion-exchange resins, and typically comprise a perfluoronated sulfonic acid polymer such as NAFION™ available from the E. I. DuPont de Nemeours & Co. The anode and cathode films, on the other hand, typically comprise (1) finely divided carbon particles, very finely divided catalytic particles supported on the internal and external surfaces of the carbon particles, and proton conductive material such as NAFION™ intermingled with the catalytic and carbon particles, or (2) catalytic particles, sans carbon, dispersed throughout a polytetrafluoroethylene (PTFE) binder. One such MEA and fuel cell is described in U.S. Pat. No. 5,272,017 issued Dec. 21, 1993, and assigned to the assignee of the present invention.

The MEA is interdisposed between sheets of porous, gas-permeable, conductive material which press against the anode and cathode faces of the MEA and serve as the primary current collectors for the anode and cathode, and the mechanical support for the MEA. Suitable such primary current collector sheets comprise carbon or graphite paper or cloth, fine mesh noble metal screen, and the like, as is well known in the art. This assembly is referred to as the MEA/primary current collector assembly herein.

The MEA/primary current collector assembly is pressed between a pair of non-porous, electrically conductive separator plates which serve as secondary current collectors for collecting the current from the primary current collectors and conducting current between adjacent cells internally of the stack (i.e., in the case of bipolar plates) and at the ends of a cell externally of the stack (i.e., in the case of monopolar plates). The secondary current collecting plate contains a flow field that distributes the gaseous reactants (e.g., $H_2$ and $O_2$/air) over the surfaces of the anode and cathode. These flow fields generally include a plurality of lands which engage the primary current collector and define therebetween a plurality of flow channels through which the gaseous reactants flow between a supply header at one end of the channel and an exhaust header at the other end of the channel.

Conventionally, separator plates are formed of a suitable metal alloy such as stainless steel protected with a corrosion-resistant, conductive coating. Recently, efforts have been directed to the development of a composite separator plate. The design parameters are such composite separator plates require that the materials used have certain electrical and thermal conductivity. In this regard, material suppliers are developing high carbon-loading composite plates consisting of graphite powder in the range of 70% to 90% by volume in a polymer matrix to achieve the requisite conductivity targets. Separator plates of this composition survive the corrosive fuel cell environment and, for the most part, meet cost and conductivity targets. However, due to the high graphite loading and the high specific gravity of graphite, these plates are inherently brittle and dense which yield less than desired volumetric and gravimetric stack power densities. Efforts have been made to reduce the fuel cell stack mass and volume by using thinner plates. Unfortunately, the brittle nature of these plates frequently result in cracking and breaking, especially in the manifold sections of the plate, during part demolding, during adhesive bonding, and during stack assembly operations.

Thus, there is a need to provide a suitable composite material for a fuel cell separator plate and a method of manufacture which overcomes the inherent problems associated with high carbon-loading plates and the inferior properties associated therewith. As such, the use of a low carbon-loading, high polymer-loading plate material is desirable to reduce the brittleness of the separator plate and to meet fuel cell stack mass and volume targets. However, at low carbon concentrations, it is extremely difficult to meet the desired electrical and thermal conductivity targets.

It would be beneficial to include a higher aspect ratio conductive filler to increase conductivities, at the same or lower total volume concentration, by reducing the number and width of polymer insulating gaps between individual conductive particles. Such fibers are known to align in the flow direction (i.e., in the in-plane direction) during the injection and/or compression molding process, generating large electrical and mechanical anisotropies in the final part. Unfortunately, in the case of fuel cell separator plates, fiber alignment is required in the through-plane direction (i.e., through the thickness) to meet through-plane conductivity targets while maintaining a relatively low fiber content for reduced material costs.

Therefore, it is desirable to provide a fuel cell separator plate formed of a robust composite material having adequate electrical and thermal conductivity properties and a method of manufacturing such fuel cell separator plates.

SUMMARY OF THE INVENTION

The present invention is directed to a composite separator plate for use in a fuel cell stack of the type having a plurality of flow channels formed therein. The composite material of the separator plate include a polymeric material such as a thermoset or thermoplastic polymer and a fibrous conductive filler having a through-plane orientation which provides a path of conductivity through the separator plate between the top and bottom surface thereof.

The present invention is further directed to a method of manufacture which aligns a fibrous conductive filler in the through-plane direction of a separator plate during injection molding, compression molding or injection compression molding for purposes of increasing the electrical and thermal through-plane conductivity of the separator plate. Through-plane alignment of the fibers enables the conductivity targets to be met at low fiber concentrations, which in turn, helps reduce plate costs, weight, volume and thickness. The design geometry of the mold generates the required flow kinematics (i.e., velocity and velocity gradients) to impart tension and shear forces onto the fiber surface during molding, thereby aligning the fibers in the desired through-plane direction. Specifically, the separator plate is molded with an extra land height which aligns the conductive fibers in a through-plane orientation. After the separator plate is removed from the mold, the extra land height is removed to expose the ends of a portion of the conductive fibers at the land surface.

BRIEF DESCRIPTION OF THE DRAWINGS

The invention will be better understood when considered in the light of the following detailed description of a specific embodiment thereof which is given hereafter in conjunction with the several figures in which.

DESCRIPTION OF THE PREFERRED EMBODIMENT

Figure 1:
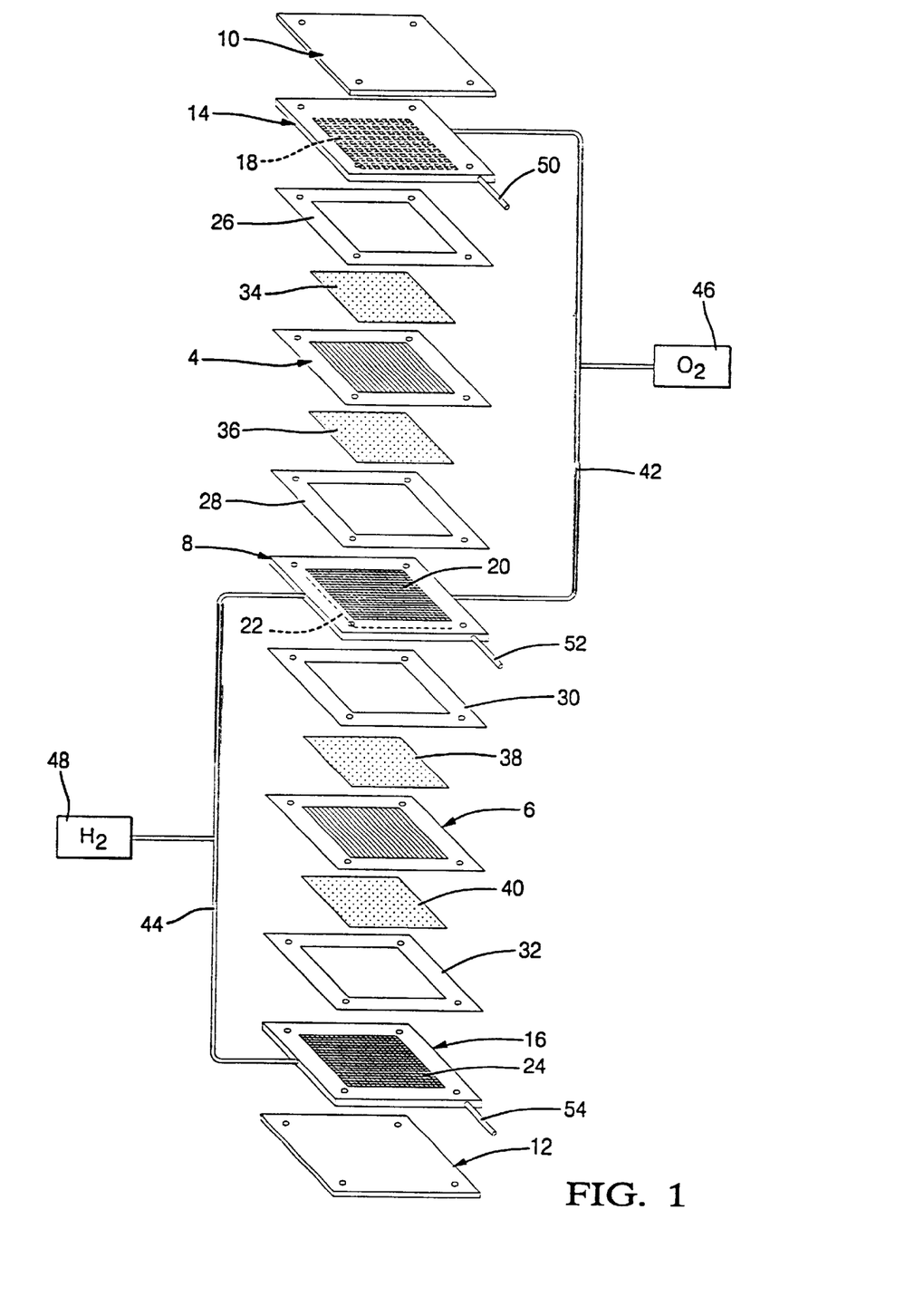
FIG. 1 is a schematic exploded illustration of a PEM fuel stack.

With reference to FIG. 1 a partial PEM fuel cell stack is schematically illustrated having a pair of membrane electrode assemblies (MEAs) 4, 6 separated from each other by a non-porous, electrically-conductive bipolar separator plate 8. MEAs 4, 6 and separator plate 8 are stacked together between stainless steel clamping plates 10 and 12, and monopolar separator plates 14, 16. Separator plates 8, 14, 16, each contain flow fields 18, 20, 22, 24 having a plurality of channels formed in the faces of the plates for distributing fuel and oxidant gases (i.e., $H_2$ & $O_2$) to the reactive faces of MEAs 4, 6. Nonconductive gaskets or seals 26, 28, 30, 32 seal and electrical insulate plates 8, 14, 16 of the fuel cell stack. Primary current collectors 34, 36, 38, 40 are formed of porous, gas-permeable, electrically-conductive sheets which press up against the reactive faces of MEAs 4, 6. Primary current collectors 34, 36, 38, 40 also provide mechanical supports for MEAs 4, 6 particularly at locations where the MEAs are otherwise unsupported across the flow channels in the flow field. Suitable primary current collectors include carbon/graphite paper/cloth, fine mesh noble metal screens, open cell noble metal foams, and the like which conduct current from the electrodes while allowing fuel and oxidant gas to pass therethrough.

Separator plates 14, 16 press up against primary current collectors 34, 40, respectively, while separator plate 8 presses up against primary current collector 36 on the anode face of MEA 4 and against the primary current collector 38 on the cathode face of MEA 6. Oxygen is supplied to the cathode side of the fuel cell stack from a storage tank 46 via appropriate supply plumbing 42, while hydrogen is supplied to the anode side of the fuel cell from a storage tank 48, via appropriate supply plumbing 44. The $O_2$ tank 46 may be eliminated and air supplied to the cathode side from the ambient, and the $H_2$ tank 48 may be eliminated and hydrogen supplied to the anode from a reforming system which catalytically generates hydrogen from methanol or a liquid hydrocarbon (e.g., gasoline). Exhaust plumbing (not shown) for both the $H_2$ and $O_2$/air sides of MEAs 4, 6 is also be provided for removing $H_2$-depleted anode gas from the anode flow field and $O_2$-depleted cathode gas from the cathode flow field. Additional plumbing 50, 52, 54 is provided for circulating liquid coolant through plates 8, 14, 16 as may be needed.

Figure 3:
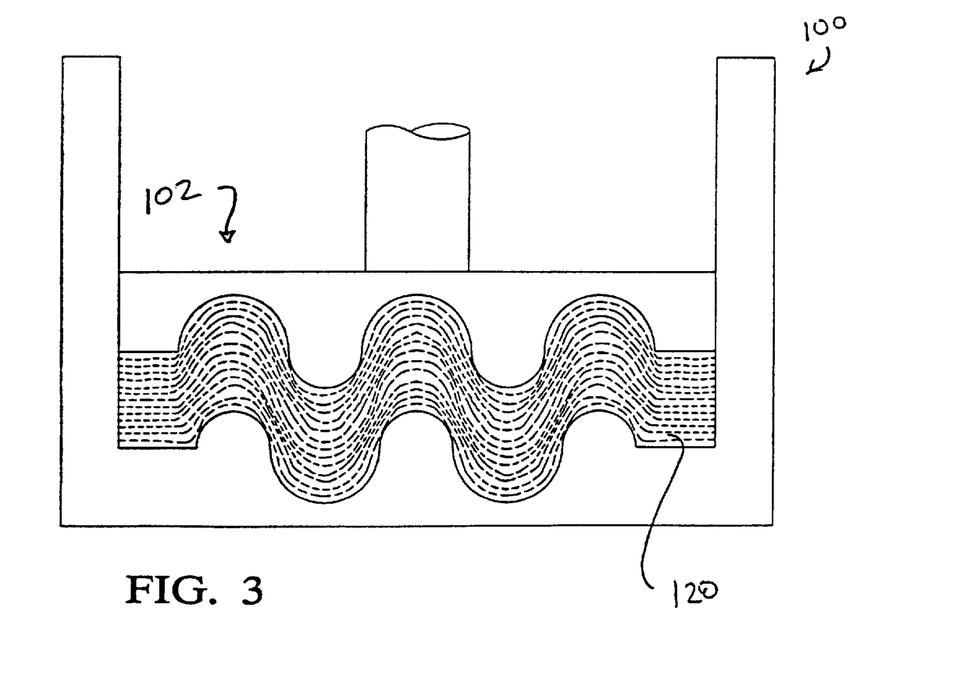
FIG. 3 illustrates the compression molding apparatus shown in FIG. 2 after the composite material charge has been compression molded.
Figure 4:
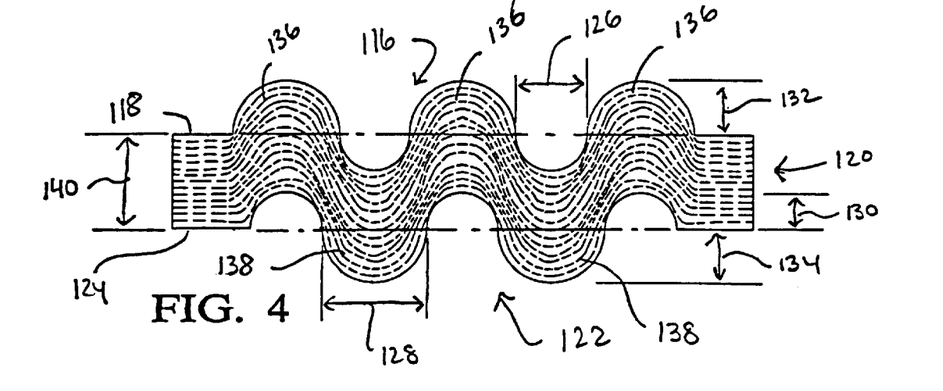
FIG. 4 illustrates a composite separator plate formed in accordance with the present invention having extra land height formed thereon.

One aspect of the present invention provides a process to align conductive fibers in a through-plane orientation through the use of a compression molding process. Specifically, with reference to FIGS. 2 and 3, a press 100 is provided having a die set 102 including a first molding surface 104 and a second molding surface 106 formed therein. First molding surface 104 has a plurality of grooves 108 formed therein defining a plurality of complimentary ridges 110. Likewise, second molding surface 106 has a plurality of grooves 112 formed therein defining a plurality of complementary ridges 114. In this manner, molding surface 104 forms a molded flow field 116 in the upper surface 118 of composite separator plate 120 as illustrated in FIG. 4. Similarly, second molding surface 106 forms a molded flow field 122 in the lower surface 124 of composite separator plate 120.

Figure 2:
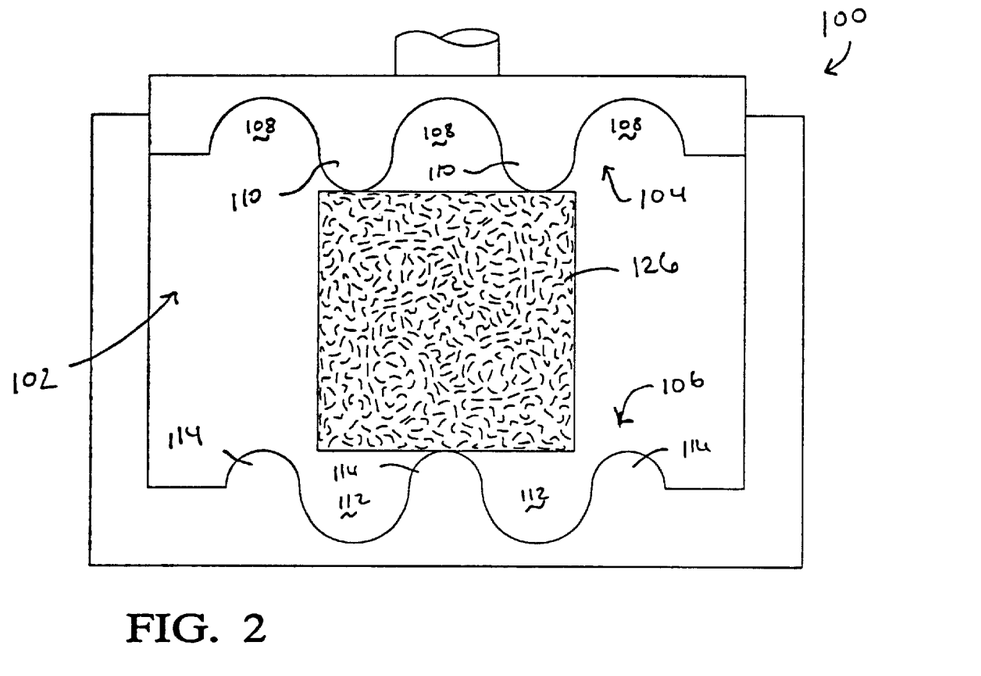
FIG. 2 is a schematic illustration of a compression molding apparatus showing a composite material charge loaded in a die set prior to forming.

With reference again to FIGS. 2 and 3, a composite material charge 126 is loaded into die set 102 in a conventional manner and compression molded between molding surfaces 104 and 106 to form the composite separate plate 120. As described in further detail hereafter, the composite material charge includes a polymeric material of 50% to 98% by % volume and a fibrous conductive material of 2% to 50% by volume %. Initially, the fibrous conductive material is generally randomly oriented within the charge as seen in FIG. 2. During the compression molding process, the pressing force applied to composite material charge 126 imparts internal tension and shear forces onto the fibrous conductive material causing orientation which is generally parallel to the molding surface as seen in FIG. 3. The periodic arrangement of channels 108, 112 and ridges 110, 114 creates a vertical or through-plane orientation of the fibrous material at the midsection of the separator plate during the compression molding process. However, the orientation of the fibrous material at the boundary surfaces remain generally in-plane.

Figure 5:
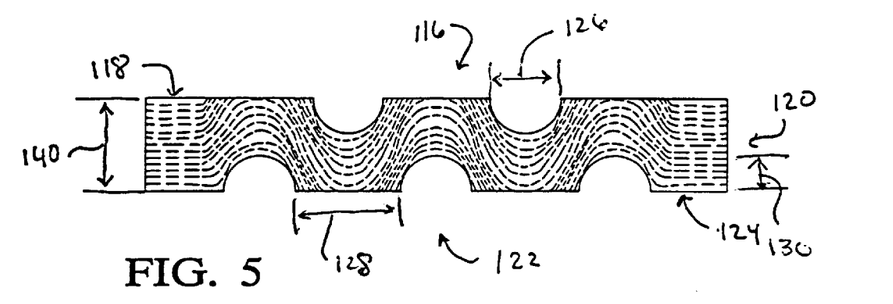
FIG. 5 illustrates the composite separate plate shown in FIG. 4 in which the extra land height has been removed therefrom.

As seen in FIGS. 3 and 4, the geometry of molding surfaces 104, 106, and hence the geometry of the molded flow fields 116, 122 play an important part in the through-plane orientation of the conductive fibrous material. While many parameters may be used to define plate geometry such as groove length 126, land length 128 and group depth 130, it has been found that the inclusion of an extra land height 132 extending above upper surface 118 and an extra land height 134 extending below lower surface 124 is the most influential geometric parameter for controlling fiber orientation. Thus, grooves 108 formed in molding surface 104 are configured to form upper land extensions 136 extending from upper surface 118 of composite plate 120. Similarly, grooves 112 formed in lower molding surface 106 are configured to form lower land extensions 138 extending below lower surface 124. The additional material associated with upper and lower land extensions 136, 138 is subsequently removed after molding to arrive at the desired separator plate configuration as shown in FIG. 5.

Based on the foregoing discussion, one skilled in the art will readily recognize that the geometry of the molded flow field pattern in separator plate 120 can significantly affect the amount of through-plane fiber orientation, and hence the thermal and electrical conductivity thereof. It has been found that through-plane fiber orientation is favored by having a more narrow flow field groove length 126 and more round profile of such grooves, as well as wider land lengths 128. Moreover, the through-plane fiber orientation is significantly enhanced by adding land extensions 136, 138. As presently preferred, extra land height 132, 134 is within the range of 10% to 50% of the thickness 140 of the desired separator plate. For example, extra land height 132, 134 would be approximately 0.2–1.0 millimeters for a separator plate having a thickness 140 of 2.0 millimeters. While a land height above the preferred 10% to 50% range will provide additional through-plane fiber orientation, such additional land height significantly impacts the material and processing costs of the final product.

Figure 6:
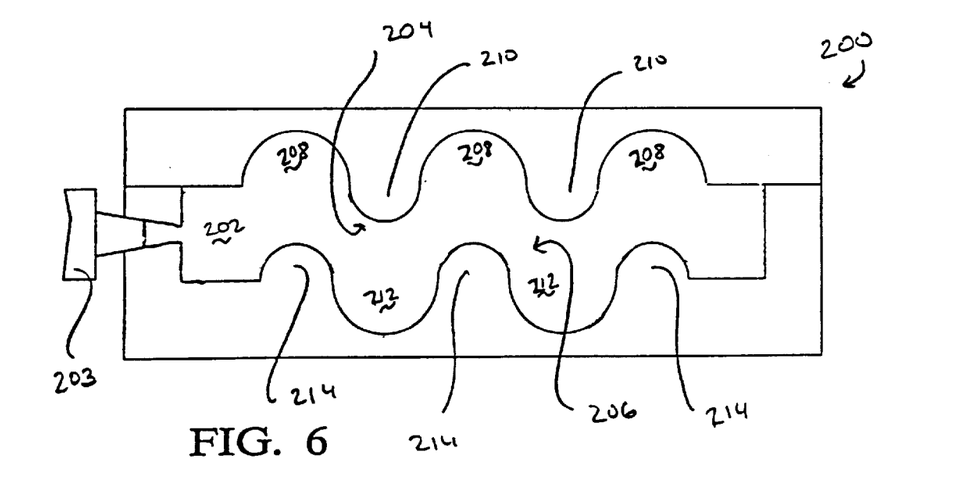
FIG. 6 is a schematic illustration of an injection molding apparatus in which a composite material is injected into a die cavity formed therein.
Figure 7:
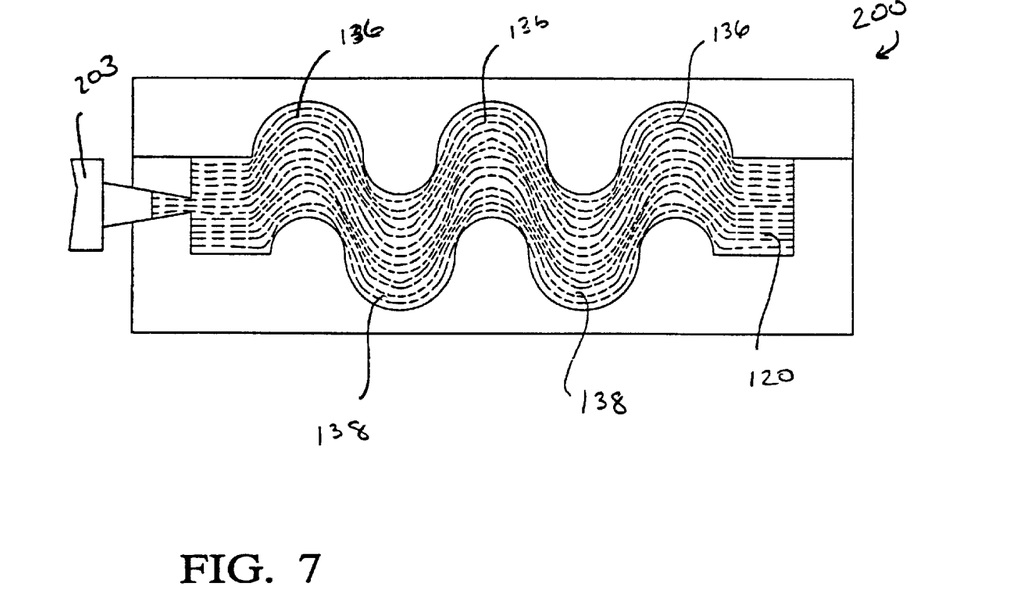
FIG. 7 illustrates the injection molding apparatus shown in FIG. 6 after injection of the composite material into the die cavity.

While in the above described embodiment, a compression molding process is disclosed in detail, once again one skilled in the art will readily recognize that other molding processes may be utilized to achieve the same ends. With reference to FIGS. 6 and 7, for example, an injection molding process is illustrated in which an injection mold 200 is illustrated which includes a die cavity 202 having first and second molding surfaces 204, 206 formed therein. Molding surfaces 204, 206 include a plurality of grooves 208, 212 and ridges 210, 214 which define the geometry of the molded flow fields of the composite separator plate 120. An injection nozzle 203 is in fluid communication with die cavity 202 for injecting a composite material therein to form the composite separator plate 120. Once formed by the injection molding process, composite separator plate 120 is removed from the die set. The upper and lower land extensions 136, 138 are then removed using a suitable machining operation. Similar to the compression molding process described with reference to FIGS. 2 and 3, the injection molding process generates sufficient tension and shear forces to achieve the desired fiber orientation.

Figure 8:
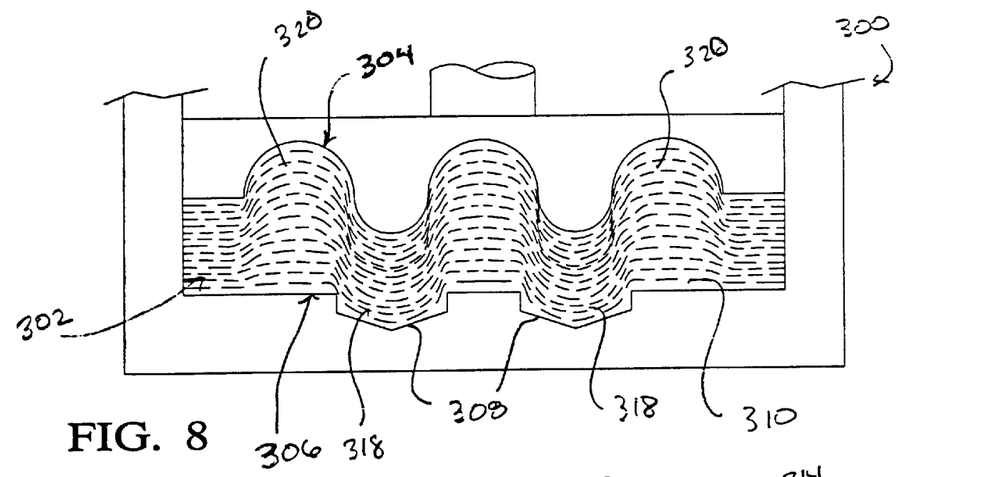
FIG. 8 is a schematic illustration of a compression molding apparatus for forming a composite separator plate having a flow field formed on one surface thereof.
Figure 9:
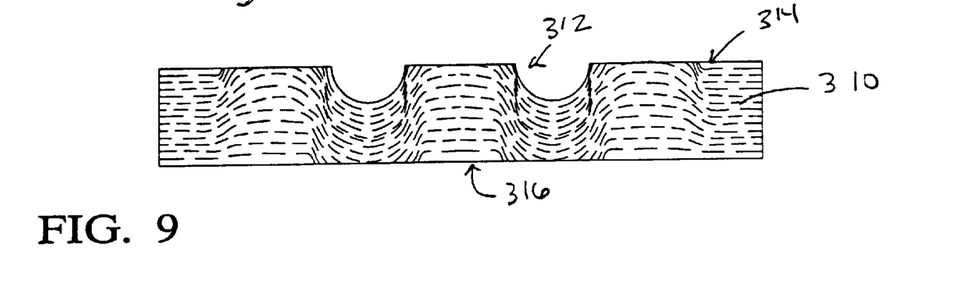
FIG. 9 illustrates the composite separator plate formed in the compression mold apparatus illustrated of FIG. 8 in which the extra land height has been removed therefrom.

While the foregoing examples have related to the fabrication of a bipolar separator plate, the present invention may be used in the fabrication of a monopolar or end separator plate. With reference to FIGS. 8 and 9, a compression molding press 300 for forming a composite end separator plate 310 is illustrated. A press 300 includes a die set 302 having an upper molding surface 304 and a lower molding surface 306. The upper molding surface 304 is substantially identical to the upper molding surface 104 described in connection with FIGS. 2 and 3. The lower molding surface 306 has a plurality of grooves 312 formed therein. However, these grooves 312 do not define a complementary ridge. As such, a composite separator plate 310 would include a molded flow field 312 in the upper surface 314 only. The lower surface of 316 having only a lower land extension 318 extending therefrom. Once removed from press 300, composite separator plate 310 is subsequently machined to remove upper and lower land extensions 318, 320 to arrive at the final composite separator plate geometry.

In the foregoing examples, various compression molding and injection molding processes have been disclosed with reference to the present invention, and more particularly to a die set or a die cavity capable of forming a composite separator plate having certain land extension details on the upper and lower surfaces. However, one skilled in the art will readily recognize that other conventional forming processing, such as injection-compression molding, may be utilized to fabricate a composite separator plate having such land extension features. As such, the present invention is not limited to the compression molding or injection molding techniques discussed herein but encompasses other suitable molding processes.

With general reference to the figures, the present invention is directed to a separator plate formed of a composite material having a composition of a polymeric material of 50% to 98% by volume % and a fibrous conductive material of 2% to 50% by volume. The composite separator plate is formed using a process such that the fibrous conductive materials are disposed in a through-plane orientation, whereby the effective resistance of the composite separator plate is less than or equal to 50 milliohms·centimeters squared ($m\Omega \cdot cm^2$) at a compression ratio of less than or equal to approximately 14 kilogram force per centimeters squared ($Kgf/cm^2$). In this regard, the effective resistance includes the contact resistance between the primary collector (e.g. 34, 36, 38 or 40) and the separator plate (e.g. 8, 14 or 16) and the bulk resistance of the separator plate (e.g. 8, 14 or 16).

In accordance with the present invention, the polymeric material is preferably a suitable thermoset polymer and more preferably selected from the group of material including silicone, poly-isobutylene, epoxy, vinyl ester and phenolic. Alternately, the polymeric material is preferably a suitable thermoplastic and more preferably selected from the group of materials including polypropylene, ethylene tetrafluoroethylene (ETFE), nylon and rubber-modified polypropylene. While the foregoing thermoset and thermoplastic polymers are presently preferred, one skilled in the art will readily recognize that other similar materials may also be suitable given the particular design specification of an application.

In accordance with the present invention, the conductive fibrous filler includes a fiber material having an aspect ratio (i.e., the ratio of length to thickness) of greater than approximately 5:1 and exhibiting good electrical and thermal conductivity characteristics. In this regard, preferred conductive fiber materials presently include carbon fibers (such as pitch-based fibers, PAN-based fiber, or others), graphite fibers, nickel-coated graphite fibers and various metal fibers including stainless steel fibers. While the fibrous conductive filler generally has an aspect ratio greater than 5:1, the conductive fibers more preferably have an aspect ratio of greater than 10:1, and most preferably an aspect ratio of greater than 15:1.

In addition to the polymeric material and the conductive fibrous filler, the composite of the present invention may optionally include a non-conductive fibrous material of 1% to 10% by volume % for enhancing the mechanical properties of the composite material. As presently preferred, the non-conductive fibrous filler may be selected from the group including glass fibers. Similarly, the composite material of the present invention may include a conductive, non-fibrous material of up to 10% by volume %. As presently preferred, the conductive non-fibrous material may preferably be selected from the group including carbon black, graphite powders and metal-based powders.

In accordance with the present invention, two fiber-filled, polypropylene-based composite material formulations have been identified as presently preferred materials. A first material composition includes 15% by volume graphitized pyrograph carbon fiber sold under the trademark PYROGRAPH PR-11 carbon fiber having an aspect ratio in the range of 100:1 to 150:1, 5% Ketjen EC300J carbon black, and 5% PAN MF30 (trademark) carbon fiber having an aspect ratio in the range of 15:1 to 20:1. The second preferred composition contains 40% by volume of PAN carbon fibers sold under the trademark PAN MF30 having an aspect ratio in the range of 15:1 to 20:1.

With general reference to the figures, the process for manufacturing the composite separator plate will now be described. Initially, a composite material having a polymeric material and a conductive fibrous filler material is formulated. The polymer resin can be a thermoplastic or a thermoset polymer, preferably an inexpensive, low density resin with good toughness and ductility. The conductive fibrous filler should possess a high-aspect ratio in the range of 10:1 to 500:1. However, one skilled in the art will readily recognize that mixing of a high-aspect ratio filler with other low-aspect ratio conductive fillers is acceptable and in some instances preferred. The conductive filler concentration including fibrous and non-fibrous material preferably range between 10% and 60% by volume. In addition, non-conductive fiber fillers in the range of up to 10% by volume may be added to improve mechanical properties.

Next, the composite material including the polymer resin and fillers are mixed using conventional polymeric mixing methods to provide good dispersion of the filler and the polymer matrix, while at the same time maintaining the length of the high-aspect ratio conductive filler. In other words, the mixing method should not break the fibrous material, thereby decreasing to any significant degree the conductivity. In this regard, Brabender, milling or twin screw mixing methods are thought to be suitable for the present invention. After compounding, the composite material is formed into a composite separator plate using conventional molding techniques for polymer compositions. The design of the molding surfaces are such that a molded flow field is formed in at least one of the surfaces of the composite separator plate. In addition, land extensions are formed on and extend from the upper and lower surfaces of the separator plate. This molding surface geometry, in combination with the molding process, function to generate conductive fiber alignment in a through-plane orientation. If the viscosity of the composite material is low enough, the material may be injected molded in either a hot mold (thermoset material) or a cold mold (thermoplastic material). Alternately, the material can be injected into a compression mold to provide an initial material charge and subsequently compression molded to form the final separator plate geometry. If the material is viscous and therefore not adaptable to injection molding, the material can be placed in a mold and straight compression molded. Compression molding may provide more uniform compressive forces on the composite material and, in turn, result in less warpage of the composite separator plate. Regardless of the molding technique, the composite material should be able to flow in the mold to generate the desired fiber alignment in a through-plane orientation. Preferably, the material should flow with a component of its velocity vector perpendicular to the flow field channel length to achieve the desired fiber orientation.

Once formed and cooled, the composite separator plate is removed from the mold. The land extensions are then removed to reduce the plate thickness and, produce a finished product. Removal of the land extensions reduces the land height and forms an exposed surface such that an end of a portion of the fibrous conductive material in the composite separator plate terminates proximate to the exposed surface. More specifically, the high-aspect ratio filler in the land extensions which are aligned in the undesired in-plane direction, are removed. Removal of the land extensions can be performed by any suitable machining method depending on the particular composite material and the mechanical properties thereof. In this regard, preferred machining methods includes laser machining, water jet machining, milling, fly cutting and sanding. This machining operation has the added benefit of removing the polymer skin which may have formed during the molding operation. Upon completion of the machining operation, a final composite separator plate is formed. Through this machine operation, better control over the geometric dimensions of the composite separator plate is further obtained.

While the present invention has been disclosed in terms of various specific embodiments, these preferred embodiments are not intended to limit set forth in the claims which follow.

What is claimed is:

1. A composite separator plate for use in a fuel cell stack, of the type having a first surface with a plurality of flow channels formed therein and a second surface opposite said first surface the composite separator plate comprising a polymeric material of 50% to 98% by volume and a fibrous conductive material of 2% to 50% by volume disposed in a through-plane orientation such that the effective resistance of said composite separator plate is less than or equal to 50 milliohms·cm$^2$.

2. The composite separator plate of claim 1 herein said through-plane orientation provides a voltage drop through said separator plate between said first surface and said second surface which is less than or equal to 50 mV at a current density of approximately 6.5 ampere per square inch and a fuel-cell stacking pressure of less than or equal to approximately 14 kilogram force per centimeters squared.

3. The composite separator plate of claim 1 wherein said composite separator plate comprises a polymeric material of 60% to 80% by volume and a fibrous conductive material of 20% to 40% by volume disposed in said through-plane orientation.

4. The composite separator plate of claim 1 wherein said polymeric material is a conductive polymeric material.

5. The composite separator plate of claim 3 further comprising a conductive non-fibrous material of less than 10% by volume.

6. The composite separator plate of claim 5 wherein said conductive non-fibrous material is selected from the group consisting of carbon black, graphite powder and metal powder.

7. The composite separator plate of claim 1 wherein said polymeric material is selected from the group consisting of thermoset and thermoplastic polymers.

8. The composite separator plate of claim 7 wherein said polymeric material is selected from the group consisting of silicone, poly-isobutylene, epoxy vinyl ester and phenolic.

9. The composite separator plate of claim 7 wherein said polymeric material is selected from the group consisting of polypropylene, ETFE, nylon and rubber-modified polypropylene.

10. The composite separator plate of claim 1 wherein said fibrous conductive filler is a conductive fiber material having an aspect ratio equal to or greater than 10:1.

11. The composite separator plate of claim 10 wherein said conductive fiber material is a PAN MF 30 carbon fiber of approximately 40% by volume and having an aspect ratio of greater than 15:1.

12. The composite separator plate of claim 10 wherein said conductive fiber material is selected from the group consisting of carbon fibers, graphite fibers, nickel-coated graphite fibers, and stainless steel fibers.

13. The composite separator plate of claim 1 further comprising a non-conductive fibrous material of less than 10% by volume.

14. The composite separator plate of claim 1 wherein said fibrous conductive material comprises a first conductive fiber material of 1% and 25% by volume and a second conductive fiber material of from 1% and 25% by volume said second conductive fiber material being different from said first conductive fiber material.

15. The composite separator plate of claim 14 wherein said first conductive fiber material is a graphite fiber of approximately 15% by volume and having an aspect ratio of greater than 100:1, and said second conductive fiber material is a carbon fiber of approximately 5% by volume and having an aspect ratio of greater than 15:1.

16. The composite separator plate of claim 15 further comprising a conductive non-fibrous material of approximately 5% by volume.

17. The composite separator plate of claim 16 wherein said conductive non-fibrous material is selected from the group consisting of carbon black, graphite powder and metal powder.

18. A method of manufacturing a composite separator plate comprising the steps of:
   formulating a composite material having a polymeric material of 50% to 98% by volume and a fibrous conductive material of 2% to 50% by volume;
   molding said composite material between a first molding surface defining a first land cavity and a second molding surface having a second land cavity to form a separator plate including a first land having a first land height extending from a first side of said separator plate and a second land having a second land height extending from a second side of said separator plate, said fibrous material being oriented such that a first portion of said fibrous conductive material is disposed in said first land and a second portion of said fibrous conductive material is disposed in said second land;
   removing at least a portion of said first land, thereby reducing said first land height and forming a first exposed surface having an end of said first portion of fibrous conductive material terminating proximate said first exposed surface; and
   removing at least a portion of said second land, thereby reducing said second land height and forming a second exposed surface having an end of said second portion of fibrous conductive material terminating proximate said second exposed surface.

19. The method of manufacturing a composite separator plate of claim 18 wherein the step of molding said composite material comprises forming a charge from said, composite material placing said charge in a die set having said first and second molding surfaces formed therein, and compression molding said separator plate.

20. The method of manufacturing a composite separator plate of claim 18 wherein the step of molding said composite material comprises injecting said composite material between a die set having said first and second molding surfaces formed therein, and compression molding said composite material into said separator plate.

21. The method of manufacturing a composite separator plate of claim 18 wherein the step of molding said composite material comprises injecting said composite material into a die cavity having said first and second molding surfaces such that said separator plate is molded in said die cavity.

22. The method of manufacturing a composite separator plate of claim 18 wherein the steps of removing at least a portion of said first and second land heights reduces said first and second lands height by 20% or more.

23. The method of manufacturing a composite separator plate of claim 18 wherein the steps of removing at least a portion of said first and second lands comprises a suitable machining operation.

24. The method of manufacturing a composite separator plate of claim 18 wherein said suitable machining operation is selected from a group of machining operation consisting of laser machining, water-jet machining, milling, fly-cutting and sanding.

25. A composite separator plate comprising:
   a composite material molded to form a first land having a first land height extending from a first side of said separator plate and a second land having a second land height extending from a second side of said separator plate, said composite material including a polymeric material of 50% to 98% by volume and a fibrous conductive material of 2% to 50% by volume oriented such that a first portion of said fibrous material is disposed in said first land and a second portion of said fibrous material is disposed in said second land;
   wherein a portion of said first land is removed from said separator plate to reduce said first land height and form a first exposed surface having an end of said first portion of said fibrous conductive material terminating proximate said first exposed surface; and
   wherein a portion of said second land is removed from said separator plate to reduce said second land height and form a second exposed surface having an end of said second portion of said fibrous conductive material terminating proximate said second exposed surface.

26. The composite separator plate of claim 25 wherein said polymeric material is a conductive polymeric material.

27. The composite separator plate of claim 25 wherein composite material further comprises a conductive non-fibrous material of less than 10% by volume.

28. The composite separator plate of claim 27 wherein said conductive non-fibrous material is selected from the group consisting of carbon black, graphite powder and metal powder.

29. The composite separator plate of claim 25 wherein said polymeric material is selected from the group consisting of thermoset and thermoplastic polymers.

30. The composite separator plate of claim 29 wherein said polymeric material is selected from the group consisting of silicone, poly-isobutylene, epoxy vinyl ester and phenol.

31. The composite separator plate of claim 30 wherein said polymeric material is selected from the group consisting of polypropylene, ETFE, nylon, and rubber-modified polypropylene.

32. The composite separator plate of claim 25 wherein said fibrous conductive material is a conductive fiber material having an aspect ratio equal to or greater than 10:1.

33. The composite separator plate of claim 32 wherein said conductive fiber material is selected from the group consisting of carbon fibers, graphite fibers, nickel-coated graphite fibers, and stainless steel fibers.

34. The composite separator plate of claim 33 wherein said conductive fiber material is a PAN MF 30 carbon fiber of approximately 40% by volume and having an aspect ratio of greater than 15:1.

35. The composite separator plate of claim 25 wherein said composite material further comprises a non-conductive fibrous material of less than 10% by volume.

36. The composite separator plate of claim 25 wherein said fibrous conductive material comprises a first conductive fiber material of 1% and 25% by volume and a second conductive fiber material of from 1% and 25% by volume, said second conductive fiber material being different from said first conductive fiber material.

37. The composite separator plate of claim 36 wherein said first conductive fiber material is a graphite fiber of approximately 15% by volume and having an aspect ratio of greater than 100:1, and said second conductive fiber material is a carbon fiber of approximately 5% by volume and having an aspect ratio of greater than 15:1.

38. The composite separator plate of claim 36 wherein said composite material further comprises a conductive non-fibrous material of approximately 5% by volume.

39. The composite separator plate of claim 38 wherein said conductive non-fibrous material is selected from the group consisting of carbon black, graphite powder and metal powder.

40. A composite separator plate for use in a fuel cell stack, of the type having a first surface with a plurality of flow channels formed therein and a second surface opposite said first surface the composite separator plate comprising a polymeric material and a fibrous conductive material, said fibrous conductive material disposed in a through-plane orientation and present in an amount sufficient to provide a conductive path in said through-plane direction.

41. A composite separator plate comprising:

a composite material molded to form a first land having a first land height extending from a first side of said separator plate and a second land having a second land height extending from a second side of said separator plate, said composite material including a polymeric material and a fibrous conductive material said fibrous conductive material oriented such that a first portion of said fibrous material is disposed in said first land and a second portion of said fibrous material is disposed in said second land;

wherein has a portion of said first land is removed from said separator plate to reduce said first land height and form a first exposed surface having an end of said first portion of said fibrous conductive material terminating proximate said first exposed surface;

wherein a portion of said second land is removed from said separator plate to reduce said second land height and form a second exposed surface having an end of said second portion of said fibrous conductive material terminating proximate said second exposed surface; and wherein said fibrous conductive material is present in an amount sufficient to provide a conductive path from said first land to said second land.

42. A method of manufacturing a composite separator plate comprising the steps of:

formulating a composite material having a polymeric material and a fibrous conductive material, said fibrous conductive material present in an amount of up to 50% by volume;

molding said composite material between a first molding surface defining a first land cavity and a second molding surface having a second land cavity to form a separator plate including a first land having a first land height extending from a first side of said separator plate and a second land having a second land height extending from a second side of said separator plate, said fibrous material being oriented such that a first portion of said fibrous conductive material is disposed in said first land and a second portion of said fibrous conductive material is disposed in said second land;

removing at least a portion of said first land, thereby reducing said first land height and forming a first exposed surface having an end of said first portion of fibrous conductive material terminating proximate said first exposed surface; and removing at least a portion of said second land, thereby reducing said second land height and forming a second exposed surface having an end of said second portion of fibrous conductive material terminating proximate said second exposed surface; and provided that said fibrous conductive material is present in an amount sufficient to provide a conductive path from said first land to said second land.

* * * * *